(12) United States Patent
Kwan et al.

(10) Patent No.: US 6,261,348 B1
(45) Date of Patent: Jul. 17, 2001

(54) LASER MARKABLE COATING

(75) Inventors: Wing Sum Vincent Kwan, Deerfield; Yoshikazu Mizobuchi, Mundelein, both of IL (US)

(73) Assignee: Marconi Data Systems Inc., Wood Dale, IL (US)

( * ) Notice: Subject to any disclaimer, the term of this patent is extended or adjusted under 35 U.S.C. 154(b) by 0 days.

(21) Appl. No.: 09/339,934

(22) Filed: Jun. 25, 1999

(51) Int. Cl.[7] .................................................. C09D 11/00

(52) U.S. Cl. ................ 106/31.14; 106/31.4; 106/31.94; 106/31.96; 106/31.37; 106/31.72

(58) Field of Search .............................. 106/31.14, 31.94, 106/31.96, 31.37, 31.4, 31.72, 31.69

(56) References Cited

U.S. PATENT DOCUMENTS

| | | | |
|---|---|---|---|
| 4,179,305 | * 12/1979 | Miller | 106/292 |
| 4,571,416 | 2/1986 | Jarzombek et al. | 524/577 |
| 4,605,686 | 8/1986 | Obana | 524/577 |
| 4,612,049 | * 9/1986 | Berner et al. | 106/14.13 |
| 4,680,332 | 7/1987 | Hair et al. | 524/577 |
| 4,861,620 | 8/1989 | Azuma et al. | 427/53.1 |
| 4,880,465 | 11/1989 | Loria et al. | 106/20 |
| 4,980,390 | 12/1990 | Shorr et al. | 524/577 |
| 5,486,550 | 1/1996 | Lubas | 523/161 |
| 5,711,791 | 1/1998 | Croker et al. | 106/31.35 |
| 5,760,120 | 6/1998 | Itoh et al. | 524/431 |
| 5,792,856 | * 8/1998 | Allen et al. | 536/66 |
| 5,830,929 | 11/1998 | Stramel | 524/577 |
| 5,897,938 | 4/1999 | Shinmoto et al. | 428/354 |
| 6,013,724 | * 1/2000 | Mizutani et al. | 524/588 |
| 6,025,077 | * 2/2000 | Yamaki et al. | 428/447 |
| 6,133,342 | 10/2000 | Mizobuchi et al. | 523/161 |

FOREIGN PATENT DOCUMENTS

| | | |
|---|---|---|
| 196 52 253 | 6/1998 | (DE) . |
| 0 531 584 | 3/1993 | (EP) . |
| 0 732 358 | 9/1996 | (EP) . |
| 0 739 933 | 10/1996 | (EP) . |
| 0 754 562 | 1/1997 | (EP) . |
| 0 782 933 | 7/1997 | (EP) . |
| 2 227 570 | 8/1990 | (GB) . |
| 2 291 719 | 1/1996 | (GB) . |
| WO 94/12352 | 6/1994 | (WO) . |

OTHER PUBLICATIONS

"Laser–sensitive Pigmente im Kunststoff", *Austropak*, pp. 10–12 (1997), no month available.

Translation of AO ("Laser–sensitive Pigments im Kunstst'off", *Austropak*, pp. 10–12 (1997), no month available.

* cited by examiner

*Primary Examiner*—Helene Klemanski
*Assistant Examiner*—Veronica F. Faison
(74) *Attorney, Agent, or Firm*—Leydig, Voit & Mayer, Ltd.

(57) ABSTRACT

The present invention provides a transparent or colorless coating comprising a heat responsive material that increases in opacity when exposed to heat. An example of a heat responsive material is a silicate or a titanate. The present invention further provides a coating composition comprising a carrier and a heat responsive material. The coating can further include additives such as adhesion promoters, surface tension modifying agents, crosslinking agents, or plasticizers. The present invention further provides a method for creating a mark on a substrate comprising providing to the substrate the transparent coating to obtain a coated substrate and exposing a selected area of the coated substrate to heat, e.g., a laser, to create the mark. The present invention further provides substrates suitable for laser marking.

31 Claims, 2 Drawing Sheets

(2 of 2 Drawing Sheet(s) Filed in Color)

US 6,261,348 B1

LASER MARKABLE COATING

FIELD OF THE INVENTION

The present invention generally relates to a coating composition and a coating made from such a composition, and particularly, to a coating composition and a coating which include a heat responsive material. The coating allows high speed marking of substrates by the use of a laser.

BACKGROUND OF THE INVENTION

Laser marking technology has been used to mark substrates. The laser marking technology typically makes use of a focused laser energy to "burn off" a portion of the surface material to produce a mark. Carbon dioxide lasers having a wavelength in the infrared region are generally used for this application.

At times laser marking technology has certain advantages over other marking technologies, e.g., ink jet printing technology. For example, the maintenance of a laser equipment may be easier and more economical in certain circumstances than the maintenance of to other types of marker. For example, since the laser marking technology does not depend on the use of an ink in a liquid state to produce a mark, it is less prone to printing problems caused by ink.

In addition, laser technology allows marking of substrates at extremely high speeds. An example of the use of the technology is in the marking of expiration dates on plastic soda bottles. During laser marking, the rate of movement of the conveyor carrying the soda bottles generally ranges from about 100 to about 300 feet per minute, and it can be as high as 500 feet per minute.

Although laser marking technology has advantages, substrates suitable for laser marking are presently lacking. For example, plastics such as white high density polyethylene, metals, and white or corrugated paper cannot be readily marked.

Metal surface is difficult to mark because most metals have high heat conductivity and light reflectance values as well as high melting points. One or more of these characteristics reduce the effectiveness of the laser energy received by the metal surface in creating a mark. In the case of corrugated paper, the laser tends to damage the surface. As regards plastics, the mark created by the laser by altering, e.g., by melting or degrading, the surface of the plastic is generally of the same color as the plastic itself. This results in an inconspicuous mark.

Thus, there exists a need for substrates or substrate surfaces that are suitable for laser marking. There further exists a need for substrates or surfaces that are suitable for creating a white mark against a dark or colored background. There further exists a need for a composition suitable for providing a coating that allows laser marking of substrates.

The advantages of the present invention, as well as additional inventive features, will be apparent from the description of the invention provided herein.

BRIEF DESCRIPTION OF THE DRAWINGS

The file of this patent contains at least one drawing executed in color. Copies of this patent with color drawing will be provided by the Patent and Trademark Office upon request and payment of the necessary fee.

BRIEF SUMMARY OF THE INVENTION

Figure 1:
FIG. 1 depicts a laser mark produced on the side of a glass bottle in accordance with the present invention. The mark shows the expiration date of the contents of the bottle.

Many of the foregoing needs have been fulfilled by the present invention which provides a transparent or colorless coating comprising a heat responsive material. The opacity of the coating increases when the coating is exposed to heat. Preferably, the transparent coating is free or substantially free of a colorant such as a pigment or dye. The increase in opacity is substantially irreversible. Preferably, the increase in opacity is not due to a physical change in the heat responsive material.

The present invention further provides a mark comprising a decomposed, desolvated, polymerized, or crosslinked product of a heat responsive material. The present invention further provides substrates having the above marks. The present invention further provides a coating comprising a transparent region that includes a heat responsive material and an opaque region that includes a decomposed, desolvated, polymerized, or crosslinked product of the heat responsive material.

The present invention further provides a coating composition comprising a carrier and a heat responsive material. The coating composition is preferably transparent or colorless. The present invention further provides a method for marking a substrate comprising providing a transparent or colorless coating to the substrate and exposing to heat a selected area of the coated substrate. The heat can be provided by, e.g., a laser beam.

While the invention has been described and disclosed below in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

The present invention relies on the phenomenon that certain materials become opaque irreversibly when exposed to heat. The present invention provides a transparent or colorless coating comprising a heat responsive material that increases in opacity when exposed to heat. Preferably, the coating is free or substantially free of a colorant such as a pigment or dye.

The heat responsive material preferably becomes opaque as a result of a chemical reaction that occurs when exposed to heat. For example, the chemical reaction can include decomposition, desolvation, polymerization, crosslinking, oxidation, and/or reduction. A preferred chemical reaction is decomposition, e.g., a decomposition that results in the loss of small molecules such as water, ammonia, or carbon dioxide from the heat responsive material. It is believed that the heat responsive material undergoes an irreversible change when exposed to heat to produce microvoids, bubbles, crosslinks, and/or fine particulates. Scattering or refraction of light by one or more of these microvoids, bubbles, crosslinks, and fine particulates results in opacity. It is preferred that the heat responsive material becomes white when exposed to heat. The heat responsive material can also become opaque as a result of the loss of salvation, e.g., loss of water of salvation.

The term "opacity" herein generally refers to property of the mark that makes it readable by the human eye. Opacity can be determined by any suitable method, e.g., by measuring the absorption, transmission, or scattering of light by the mark. Thus, for example, the mark can have an absorbance of about 0.01 unit or higher and preferably from about 0.1 or higher, for a light in the visible spectrum, particularly at a wavelength of 550 nm. A coating can be defined herein as transparent if it has a transmittance of greater than about 80% at 550 nm.

Any suitable heat responsive material that undergoes a change, e.g., a chemical reaction, below a temperature of about 500° C., typically at a temperature of from about 80° C. to about 450° C., preferably at a temperature of from about 100° C. to about 450° C., and more preferably at a temperature of from about 120° C. to about 400° C., can be used to provide the coating. The heat responsive material can be a material of low molecular weight or high molecular weight. The heat responsive material can be organic, inorganic, or combinations thereof. The heat responsive material can be water, solvent, or oil soluble or dispersible.

The heat responsive material preferably comprises a resin or a precursor thereof. The heat responsive material can be organic, inorganic, or a combination of the two. Examples of inorganic resins include silicate and titanates. Examples of silicates include metal silicates, preferably alkali metal silicates. An example of a metal silicate is sodium silicate, e.g., SILICATE STAR™ from PG Corporation, Forge Valley, Pa., which is reported to be a sodium salt of silicic acid. Other examples of inorganic resins include silica gels, e.g., colloidal silica gel dispersions such as a dispersion in a glycol ether.

Examples of titanates include titanium alkoxides, titanium alkanedionates, titanium lactates, titanium aminoalkoxides, and combinations thereof. An example of a suitable titanium alkoxide is titanium ethoxide. The titanium alkoxide decomposes when exposed to heat to produce fine particulates of a titanate which impart opacity.

Examples of organic resins include carboxylated polymers such as resins having a carboxyl group or a salt thereof, and resins having derivatives of carboxyl groups, particularly thermally unstable protecting groups or derivatives, such as esters, amides, imides, anhydrides, halides, azides, and carbamates. Ammonium salts are preferred. An example of a thermally unstable protecting group is an alkyl ester having a betahydrogen. Such an alkyl ester can undergo a hydroacyloxy elimination when heated. Additional examples of organic resins include polysaccharides.

Examples of carboxylic acid polymers or resins include acrylic acid polymers, with thermally unstable protecting groups can be used. In accordance with the present invention, the carboxylated resin or the carboxylic acid polymer is selected from the group consisting of polyacrylic acid, salts of polyacrylic acid, acrylic acid copolymers, salts of acrylic acid copolymers, carboxylic acid polymers with thermally unstable protecting groups, polymers of acrylic acid derivatives, and acrylic acid derivative copolymers, and combinations thereof.

Particular examples of carboxylated polymers include acrylic resins such as polyacrylic acid or a salt thereof, e.g., JONCRYL™ 61, and copolymers comprising acrylic acid and a polymerizable monomer such as copolymers of styrene and acrylic acid, e.g., JONCRYL 74, an acrylic acid/styrene copolymer from S. C. Johnson & Son, Inc., Racine, Wis.

A water soluble resin is preferred relative to a solvent soluble resin in view of environmental concerns. Water soluble resins are particularly suitable for providing a coating by water-flexography. Resins that are not water soluble but are soluble in a mixed solvent containing water can also be used. Solvent soluble resins also can be used. An example of a suitable solvent soluble heat responsive resin is ETHOCEL™, which is an ethyl cellulose resin available from Dow Chemical Co. in Midland, Mich. ETHOCEL is soluble in lower alcohols, e.g., ethanol.

The coating can include more than one, e.g., two, three, or more, heat responsive materials. If a mixture of heat responsive materials were used, the materials preferably should be compatible with one another. The compatibility can improve or contribute to the clarity and/or transparency of the coating.

The coating of the present invention can contain the heat responsive material in any suitable proportion. The heat responsive material is present typically in an amount of from about 0.1% to about 100%, preferably in an amount of from about 10% to about 90%, and more preferably in an amount of from about 20% to about 80% by weight of the coating.

The transparent or colorless coating of the present invention is free or substantially free of a colorant. In certain embodiments, a small quantity, e.g., below about 20% by weight and preferably below about 5% by weight, of colorants such as pigments, dyes, or fluorescent or optical brighteners can be included in accordance with the present invention.

The transparent coating can be applied to a given substrate by any suitable method, e.g., by using conventional printing technology such as silk-screen printing, flexography, offset printing, dip coating, wire-bar coating, or spray coating. Thus, the heat responsive material can be dissolved or dispersed in a suitable solvent, and the resulting coating composition can be applied to the substrate as a thin film.

The present invention provides a coating composition comprising a carrier and a heat responsive material or a precursor thereof. Any suitable carrier can be used. The carrier can be organic or aqueous. Aqueous carriers are preferred for environmental reasons. Water is a preferred carrier. Examples of organic carriers include solvents such as alcohols, ketones, esters, ethers, amides, and combinations thereof. Low boiling solvents such as lower alcohols, lower ketones, and lower esters are preferred. Examples of such solvents include ethanol, acetone, and MEK. Oils can also be used as a carrier.

The coating composition can be prepared by any suitable method. For example, the heat responsive material or a precursor thereof can be dissolved or dispersed in the carrier to prepare the coating composition. High concentrations of the heat responsive material or a precursor thereof are preferred. The concentration of the heat responsive material can approach 100% by weight, and is typically up to about 90% by weight, preferably from about 20% to about 80% by weight, and more preferably from about 30% to about 80% by weight of the coating composition.

The coating composition can advantageously include one or more additives that improve the stability of the composition or the properties of the coating or the mark produced therefrom. For example, the additives can increase the adhesion of the coating to the substrate, modify the surface tension of the composition to promote wetting of the substrate, or improve environmental resistance of the coating or the mark such as resistance to hot or cold water or water vapor. Thus, the coating composition can further include an adhesion promoter, a surface tension modifying agent, a crosslinking agent, a plasticizer, or combinations thereof. Preferably, these additives are compatible with the heat responsive material.

Any suitable adhesion promoter can be employed. Examples of adhesion promoters include silanes and titanates. Examples of silanes include halosilanes and, preferably, alkoxysilanes. Examples of suitable alkoxysilanes include gamma-glycidoxypropyltrimethoxy silane, which is available as Silane A-187 from OSI Specialties Group, Tarrytown, N.Y., and Silane Z-6020, which is N-(beta-aminoethyl)-gamma-aminopropyltrimethoxysilane from Dow Corning Chemical Co., Midland, Mich.

Examples of suitable titanates include titanium alkoxides, titanium aminoalkoxides, titanium alkoxide alkanedionates, and titanium ammonium lactates, and preferably titanium alkoxides and titanium aminoalkoxides. A preferred titanate is titanium (IV) ethoxide.

The coating composition can include the adhesion promoter in any suitable amount. The adhesion promoter is used in an amount of typically up to about 20% by weight, preferably from 0.01% to about 10% by weight, and more preferably from about 0.01% to about 3% by weight of the composition.

Any suitable surfactant can be used as the surface tension modifying agent. An example of a suitable surface tension modifying agent is a silicone based surface tension modifying agent such as a polyalkyleneoxide modified siloxane, e.g., a polyethyleneoxide modified polydialkylsiloxane. Thus, SILWET™ L 7600, a polyethyleneoxide modified polydimethylsiloxane from OSI Technology Corporation, Tarrytown, N.Y., can be used.

Any suitable crosslinking agent can be used as the crosslinking agent. A preferred crosslinking agent comprises a polyfunctional silane such as a siloxy compound. An example of a siloxy crosslinking agent is tris(gamma-trimethoxypropyl)isocyanurate, available as Y11597 from Witco Chemicals. Any suitable plasticizer can be used. An example of a plasticizer is SANTICIZER™ 8, which is toluene(o,p)-ethylsulfonamide, from Monsanto Co. in St. Louis, Mo.

The surface tension modifying agent, the crosslinking agent, or the plasticizer can be present in any suitable amount, typically in an amount of up to about 20% by weight, preferably from 0.01% to about 10% by weight, and more preferably from about 0.01% to about 3% by weight of the composition.

Certain embodiments of the coating composition or the coating can further include an energy transfer agent. The energy transfer agent serves to improve the conversion to heat of the energy supplied during the marking.

The present invention further provides a method for creating a mark on a substrate comprising coating the substrate with the transparent coating as described above to obtain a coated substrate and exposing a selected area of the coated substrate to heat in order to create the mark.

An advantage of the present invention is that the coating can be very thin and still provide marks with good contrast. Thus, for example, the wet coating thickness can be typically less than about 1000 $\mu$m, e.g., less than about 500 $\mu$m, preferably from about 1 $\mu$m to about 100 $\mu$m, and more preferably from about 1 $\mu$m to about 25 $\mu$m. The dry film thickness can be typically less than about 1000 $\mu$m, e.g., less than about 500 $\mu$m, preferably from about 0.1 $\mu$m to about 100 $\mu$m, and more preferably from about 0.1 $\mu$m to about 25 $\mu$m.

The coated substrates can be marked with any suitable source of heat, e.g., laser, thermal printhead, thermal stylus, heat pen, infrared lamp, an oven, or a microwave energy based heater. For example, a focused microwave set at the vibrational frequency of water can be used to write on the coating.

Laser is a preferred source of heat. Any suitable laser can be used, for example, a $CO_2$ laser or a YAG laser. Another advantage of the method of the present invention is that substrates to be marked or coded can be advanced to the laser beam at high rates, for example, greater than about 50 feet/minute, preferably from about 50 feet/minute to about 500 feet/minute or greater, and more preferably from about 50 feet/minute to about 300 feet/minute. The maximum marking speed is primarily set by the readability of the marks produced. The maximum marking or coding speed can be determined, for example, by the highest speed at which the substrate is exposed to produce a mark having a L* value more than 25. The L* value is based on the CIELab* color scale, and increasing L* value indicates increasing whiteness.

Any suitable amount of energy can be used to create the mark. For example, the laser energy delivered to the coating can be up to 200 $kJ/cm^2$.sec, and is typically from about 0.2 $J/cm^2$.sec to about 150 $kJ/cm^2$.sec, preferably from about 1 $J/cm^2$.sec to about 150 $kJ/cm^2$.sec, and more preferably from about 15 $J/cm^2$. sec to about 150 $kJ/cm^2$. sec.

Still another advantage of the method of marking in accordance with the present invention is that marks with good contrast can be produced at relatively short laser dot times. Dot time is the time of residence of each dot of the laser beam on the substrate. The shorter the dot time, the greater the marking speed. The dot time can be less than about 254 $\mu$sec, typically less than about 100 $\mu$sec, preferably from about 1 $\mu$sec to about 100 $\mu$sec, and more preferably from about 1 $\mu$sec to about 50 $\mu$sec.

Different types of marks or codes can be generated by lasers in accordance with the present invention. Thus, numerals, letters, symbols, and graphics can be produced and the codes can be of different dimensions such as one-dimensional bar codes and two-dimensional bar codes. The latter is also known as the snowflake code.

The present invention provides a coating composition that can provide thermochromic coating on a variety of substrates. The coating is responsive to low energy lasers and produces white markings with sufficient contrast ratio.

The transparent coating of the present invention can be applied to a variety of substrates for heat or laser marking. Suitable substrates include corrugated paper, color coated paper, metals, plastics, ceramics, glass, wood, and rubber. An example of a suitable plastic substrate is a PET bottle.

The transparent coating of the present invention can be suitably protected from environmental damage, abrasion, and wear. For example, the transparent coating of the present invention can be covered by a water or oil resistant coating for increased durability.

The following examples further illustrate the present invention, but of course should not be construed in any way as limiting the scope of the invention.

EXAMPLE 1

This Example illustrates a method of providing a coating to a substrate and creating a mark according to an embodiment of the present invention. A 10% solution of HYDREZ™ 2007 resin, a solid acrylic modified resin produced by Lawter International, Northbrook, Ill., was applied as a wet film of thickness 50 $\mu$m onto a glass slide using a film applicator (BYK Gardner, Inc., Silver Spring, Md.). The film was allowed to dry overnight at the ambient temperature (20±3° C.). The film coated glass slide was then exposed to a 100 Watt laser beam (LASERPRO™ DM, Videojet Systems International, Inc., Wood Dale, Ill.) at a writing speed of 50 feet per minute. The dot time for the laser was set at 32 µsec.

EXAMPLES 2–4

These Examples illustrate the preparation of additional coated substrates in accordance with the present invention. A solution of JONCRYL 61 (solids content 35%, Example 2), a solution of JONREZ E2050 (solids content 40%, Westvaco, Charleston Heights, S.C., Example 3), or a solution of sodium silicate (SILICATE STAR, solids content 35%, Example 4) was used to coat the slides. The glass slides were dried, and then exposed to a laser as described in Example 1 to produce the marks. A control sample was prepared by coating a glass slide with sodium silicate as in Example 4, except that the slide was not exposed to a laser.

EXAMPLE 5

This Example illustrates certain properties of the marks obtained in Examples 1–4. The marks on the slides were evaluated on a HunterLab MINISCAN™ XE color spectrometer (Hunter Associates, Reston, Va.). During the measurements, the slides were placed on a black paper to provide a black background. The whiteness of the marks was expressed by the L* value. The L* values of the control sample and an uncoated glass slide also were obtained. The results obtained are set forth in Table 1. The L* values set forth below are the average of three determinations.

TABLE 1

L* values of laser marks obtained in Examples 1–4

| Example # | System | L* |
|---|---|---|
| 1 | HYD-REZ 2007/laser | 25.4 |
| 2 | JONCRYL 61/laser | 32.6 |
| 3 | JONREZ E2050/laser | 32.9 |
| 4 | SILICATE STAR/laser | 55.4 |
| — | Control Sample (SILICATE STAR, No laser) | 27.1 |
| — | Glass Slide, No laser | 17.0 |

The L* values set forth in Table 1 are the average of three determinations and show that the coated substrates were suitable for laser marking. Particularly, marks described in Examples 2–4 were readily readable.

EXAMPLE 6

This Example illustrates an advantage of a coating prepared in accordance with the present invention. The coating is markable with a laser with a short dot time.

A 50 µm thick wet film of sodium silicate (SILICATE STAR) aqueous resin solution (38% by weight resin content) containing 1% Silane Z-6020 was applied to a glass slide and the glass slide was dried overnight. The glass slide was then exposed to a 100 W laser at a rate of 50 feet per minute. Three dot time settings were employed for the laser marking. The marks produced were evaluated as set forth in Example 5, and the results obtained are set forth in Table 2. The L* values set forth below are the average of three determinations.

TABLE 2

L* values of marks formed on a coating comprising a silicate resin and a silane adhesion promoter.

| Dot Time (µsec.) | L* |
|---|---|
| 20 | 51.7 |
| 100 | 50.6 |
| 200 | 51.5 |

The foregoing shows that the coating was markable with good contrast even at a short dot time of 20 µsec.

EXAMPLE 7

This Example illustrates another advantage of the coating prepared in accordance with the present invention. The coating can be marked at high speeds.

A 50 µm thick wet film of a 38% sodium silicate (SILICATE STAR) resin aqueous solution containing 1% Silane Z-6020 was applied to glass slides and the resulting films on the glass slides were dried overnight. The glass slides were then exposed to a 100 W laser at the marking speeds of 50, 150, 250, and 350 feet per minute. The dot time for the laser was set at 32 µsec. The marks were evaluated and the results obtained are set forth in Table 3.

TABLE 3

L* values of marks formed at various coding speeds

| Speed (feet per minute) | L* |
|---|---|
| 50 | 55.4 |
| 150 | 39.2 |
| 250 | 31.7 |
| 350 | 26.0 |

The foregoing shows that the coating of the present invention can be marked at speeds as high as 350 feet per minute.

EXAMPLES 8a–c

Examples 8a–c illustrate the use of a surface tension modifier, a cross-linker, and a plasticizer, respectively, in the preparation of a coating composition in accordance with the present invention.

Coating compositions were prepared with the following ingredients in the indicated weight percentages:

Ex. 8a: 0.8% Silane Z-6020+77.2% SILICATE STAR (38% sodium silicate solution)+20.3% water+1.7% surface tension modifier SILWET L-7600

Ex. 8b: 1.5% tris(gamma-trimethoxypropyl)isocyanurate-Y11597+75.4% SILICATE STAR+23.1% water Ex. 8c: 1% Silane Z-6020+98% SILICATE STAR+1% SANTICIZER 8 (plasticizer, toluene(o,p)-ethyl sulfonamide)

The above compositions were coated onto glass slides according to the procedure described in Example 6. The dried coatings were exposed at writing speeds of up to 400 feet per minute to a 100 Watt laser beam (LASERPRO DM), and the marks obtained were readable.

EXAMPLE 9

This Example illustrates the marks produced on glass and metal substrates in accordance with the present invention.

Figure 2:
FIG. 2 depicts a laser mark produced on the bottom of an aluminum can in accordance with the present invention. The mark shows the expiration date of the contents of the can.

Thus, a coating composition containing 1% Silane A-187 in a 38% by weight sodium silicate (SILICATE STAR) aqueous solution was applied as a 50 µm film onto the side of a glass bottle and the bottom of an aluminum can. The film was allowed to dry and the substrates were then exposed to a carbon dioxide laser (100 W) at a coding speed of 50 feet per minute and a dot setting of 32 µsec. The marks obtained are depicted in FIG. 1 (glass bottle) and FIG. 2 (aluminum can). The marks had good color contrast.

While this invention has been described with an emphasis upon certain embodiments, it will be obvious to those of ordinary skill in the art that variations of the embodiments may be used and that it is intended that the invention may be practiced otherwise than as specifically described herein. Accordingly, this invention includes all modifications encompassed within the spirit and scope of the invention as defined by the following claims.

What is claimed is:

1. A composition comprising a carrier, a heat responsive material and an additive selected from the group consisting of an adhesion promoter, a surface active agent, a crosslinking agent, a plasticizer, and combinations thereof, wherein said heat responsive material comprises a salt of silicic acid or a titanate or a precursor thereof and the composition is capable of forming a colorless or transparent coating.

2. The composition of claim 1, wherein said adhesion promoter comprises a silane.

3. The composition of claim 1, wherein said crosslinking agent comprises a silicon compound.

4. A composition comprising a carrier, a heat responsive material and an additive selected from the group consisting of an adhesion promoter, a surface active agent, a crosslinking agent, a plasticizer, and combinations thereof, wherein said adhesion promoter is gamma-glycidoxypropyltrimethoxy silane and the composition is capable of forming a colorless or transparent coating.

5. The composition of claim 4, wherein said crosslinking agent comprises a silicon compound.

6. A composition comprising a carrier, a heat responsive material and an additive selected from the group consisting of an adhesion promoter, a surface active agent, a crosslinking agent, a plasticizer, and combinations thereof, wherein said crosslinking agent comprises a siloxy compound and the composition is capable of forming a colorless or transparent coating.

7. The composition of claim 6, wherein said crosslinking agent is tris(gamma-trimethoxysilylpropyl)isocyanurate.

8. The composition of claim 4, wherein said adhesion promoter comprises a silane.

9. A coating comprising a transparent region that includes a heat responsive material and an opaque region that includes a decomposed, polymerized, desolvated, or crosslinked product of the heat responsive material, wherein the decomposed product of the heat responsive material comprises a microvoid, a bubble, a particle, or a combination thereof.

10. The coating of claim 9, wherein the heat responsive material is a resin or a precursor thereof.

11. The coating of claim 10, wherein said resin is an organic resin.

12. The coating of claim 10, wherein said resin is an inorganic resin.

13. The coating of claim 11, wherein said organic resin comprises an acrylic resin, a cellulosic resin, polysaccharides, or a combination thereof.

14. The coating of claim 11, wherein said organic resin comprises a carboxylated resin.

15. The coating of claim 14, wherein said carboxylated resin is selected from the group consisting of polyacrylic acid, salts of polyacrylic acid, acrylic acid copolymers, salts of acrylic acid copolymers, carboxylic acid polymers with thermally unstable protecting groups, polymers of acrylic acid derivatives, and acrylic acid derivative copolymers, and combinations thereof.

16. The coating of claim 10, wherein said resin comprises a silicate or a titanate.

17. The coating of claim 16, wherein said silicate comprises a salt of silicic acid.

18. A method of marking a substrate comprising providing to said substrate a coating that includes a transparent or colorless heat responsive material to obtain a coated substrate and exposing to heat said coated substrate so as to create the mark therein.

19. The method of claim 18, wherein said coated substrate is exposed to heat provided by a laser beam.

20. The method of claim 18, wherein said heat responsive material becomes white when exposed to heat.

21. The method of claim 18, wherein said heat responsive material is a resin or a precursor thereof.

22. The method of claim 18, wherein said coating further includes an additive selected from the group consisting of an adhesion promoter, a surface active agent, a crosslinking agent, a plasticizer, and combinations thereof.

23. The method of claim 18, wherein said heat is provided by a thermal printhead, a thermal stylus, a heat pen, an infrared lamp, a microwave energy based heater, or an oven.

24. The method of claim 18, wherein the heat responsive material is a resin or a precursor thereof.

25. The method of claim 24, wherein said resin is an organic resin.

26. The method of claim 24, wherein said resin is an inorganic resin.

27. The method of claim 25, wherein said organic resin comprises an acrylic resin, a cellulosic resin, polysaccharides, or a combination thereof.

28. The method of claim 25, wherein said organic resin comprises a carboxylated resin.

29. The method of claim 28, wherein said carboxylated resin is selected from the group consisting of polyacrylic acid, salts of polyacrylic acid, acrylic acid copolymers, salts of acrylic acid copolymers, carboxylic acid polymers with thermally unstable protecting groups, polymers of acrylic acid derivatives, and acrylic acid derivative copolymers, and combinations thereof.

30. The method of claim 24, wherein said resin comprises a silicate or a titanate.

31. The method of claim 30, wherein said silicate comprises a salt of silicic acid.

* * * * *